United States Patent [19]

Weihs

[11] Patent Number: 5,055,970
[45] Date of Patent: Oct. 8, 1991

[54] SCANNING APPARATUS FOR CHIP CARD
[75] Inventor: Hans Weihs, Purkersdorf, Austria
[73] Assignee: U.S. Philips Corporation, New York, N.Y.
[21] Appl. No.: 407,395
[22] Filed: Sep. 14, 1989
[30] Foreign Application Priority Data Sep. 23, 1988 [AT] Austria .................................. 2364/88

[51] Int. Cl.$^5$ .............................................. H05K 5/00
[52] U.S. Cl. .................................... 361/399; 235/486; 235/492; 361/391; 439/259; 439/260
[58] Field of Search .................. 211/41; 439/260, 342, 439/374, 297, 372, 326, 296, 325; 235/441, 492, 483, 485, 486; 361/391, 415, 399; 360/33.1

[56] References Cited

U.S. PATENT DOCUMENTS 4,743,746  5/1988  Murschall et al. .................. 439/326
4,795,897  1/1989  Chalendard ........................ 235/482

FOREIGN PATENT DOCUMENTS 0214478  3/1987  European Pat. Off. .
2198595  6/1988  United Kingdom .

OTHER PUBLICATIONS

Japanese Abstract for 62-271287, "IC Card Reader/Writer", Nov. 25, 1987, Junichiro Morioka.
Japanese Abstract for 62-117091, "IC Card Reading and Writing Device", May 28, 1987, Hisaya Nakamura.
Japanese Abstract for 62-88078, "IC Card Reader and Writer", Apr. 22, 1987, Takashi Ebisawa.

Primary Examiner—Leo P. Picard
Assistant Examiner—Donald A. Sparks
Attorney, Agent, or Firm—William Squire

[57] ABSTRACT

A scanning apparatus for a chip card has a fixedly arranged first set of contacts. A drawer is displaceable in level relative to the contacts and, into which drawer, in the position in which it is withdrawn from the apparatus, the chip card can be inserted into an accommodation space within the drawer. The card is located at a distance spaced from the level of the set of contacts. Guides cooperate on both sides with the drawer and cause the drawer to displace stepwise upon insertion of the drawer into the apparatus in the region of the set of contacts towards the level of the first set of contacts.

21 Claims, 3 Drawing Sheets

SCANNING APPARATUS FOR CHIP CARD

BACKGROUND OF THE INVENTION

1. Field of the Invention

The invention relates to a scanning apparatus for a chip card, which has a fixedly arranged set of contacts, to which a chip card inserted into a displaceable accommodation device can be carried, the set of contacts engaging contacts provided on the chip card.

2. Description of the Prior Art

In such a scanning apparatus known from European patent application 0,214,478, the accommodation device takes the form of a shaft and is pivotably arranged within the apparatus. A chip card inserted into the accommodation device is displaced by pivoting the accommodation device towards the set of contacts fixedly arranged in the apparatus. A contacting, which takes place by an exclusive pivotal movement and is, so to say, point-shaped, of the contacts provided on the chip card by the set of contacts on the side of the apparatus has proved in practice to be not reliable and faultless in all circumstances, as a result of which the operation of the apparatus can be adversely affected.

SUMMARY OF THE INVENTION

The invention has for its object to ensure a faultless and reliable engagement of the chip card contacts by the set of contacts on the side of the apparatus in a scanning apparatus of the kind mentioned in the opening paragraph in a constructively particularly simple manner and with a particular ease of operation. According to the invention, the accommodation device takes the form of a drawer which is displaceable in level. A chip card is inserted into an accommodation space limited by abutment stops within the drawer in the position of the drawer in which the drawer is withdrawn from the apparatus. In that accommodation space the card is located within the drawer at a certain distance in level from the level of the set of apparatus contacts. To adjust the drawer, guide means are adapted to cooperate with it on either side, which displace the drawer upon insertion into the apparatus at the area of the set of apparatus contacts stepwise towards the level of the apparatus contacts. When the chip card is carried stepwise to the fixedly arranged set of apparatus contacts by displacing the drawer in level, a slipping contacting of the contacts provided on the chip card by the set of contacts on the side of the apparatus occurs in the last section of the movement cycle then taking place, as a result of which the engagement of the contacts is reliable and faultless. As is apparent, the construction is simple and a simple manipulation is also obtained for the user of such a scanning apparatus when inserting a chip card into the apparatus and removing it therefrom, respectively, because for this purpose only a drawer must be displaced in a usual manner. It should be noted here that a slipping contacting in such scanning apparatuses is known per se, in which, however, the set of contacts on the side of the apparatus is not fixedly arranged in the apparatus, but this set of contacts is carried itself in a stepwise movement to a chip card insertable into the apparatus, as described, for example, in European patent application 0,234,654. In this case, however, a disadvantage is present in that a flexible lead connection to the displaceable set of contacts must be established, which can lead to difficulties in signal transmission because, as is known, the life of flexible lead connections is not very long, especially if frequently moved as pointed out in the aforementioned European patent application 0,214,478. On the contrary, the embodiment of a scanning apparatus according to the invention has both the advantages of a set of contacts fixedly arranged on the side of the apparatus and the advantages of a slipping contacting, with a simple construction of the apparatus as well as with a simple manipulation thereof.

It is advantageous when two abutment stops laterally limiting the accommodation device, viewed in the direction of insertion, are formed by guide ribs for a chip card to be inserted into the accommodation space within the drawer the ribs originate from the region of the drawer facing the set of apparatus contacts and extend along at least one section of the accommodation space. The ribs are in the region of the drawer facing the set of apparatus contacts sectionwise with rims overlapping the accommodation space. Thus, a reliable and simple insertion of a chip card into the accommodation space within the drawer is attained wherein the rims ensure that the chip card cannot be lifted especially in the region facing the set of apparatus contacts from the bottom of the accommodation space within the drawer.

In this connection, it is further advantageous when at least the boundary surfaces of the rims facing the accommodation space, viewed in a direction opposite to the direction of insertion, are formed so as to at least move sectionwise upwards obliquely away from the accommodation space. Thus, a lightly oblique insertion of a chip card into the accommodation space within the drawer is permitted, which considerably simplifies this process. The same also applies to the removal of a chip card from the accommodation space within the drawer.

It is further advantageous when, viewed in the direction of insertion, a hook is provided on the apparatus so as to extend laterally beside the accommodation space, which hook projects essentially into a region of the drawer remote from the set of apparatus contacts. The hook is resilient transversely to the direction of insertion and has at its free end an ascending surface adapted to cooperate with the relevant lateral edge region of a chip card. During insertion of the drawer into the apparatus contacts, upon its stepwise displacement towards the level of the set of contacts a chip card inserted into the accommodation space within the drawer falls into the hooks. During withdrawing of the drawer from the apparatus upon its stepwise displacement away from the level of the set of contacts, the chip card is held by the hooks at the level of the set of apparatus contacts and is pushed out of the accommodation space within the drawer. Thus, after a withdrawal of the drawer from the apparatus, the chip card is slightly lifted from the accommodation space at a region remote from its set of contacts and thus can be readily gripped by hand and removed from the drawer.

In this connection, it is further advantageous when a spring device at the drawer cooperates with a chip card inserted into the accommodation space within the drawer. The spring device loads the chip card in the direction opposite to the direction of insertion and holds it against at least one abutment stop limiting the accommodation space within the drawer in the direction opposite to the direction of insertion. The chip card is released from the stop during the operation of withdrawing the drawer from the apparatus by the hook holding it at the level of the set of apparatus contacts.

The card and is partly pushed out of the drawer under the action of the spring device in the direction opposite to the direction of insertion. By this measure, when withdrawing the drawer from the apparatus, a chip card present in the accommodation space of the drawer is automatically pushed slightly out of the drawer so that it can be very readily gripped by hand and can then be fully removed from the drawer.

It is also advantageous when the drawer inserted into the apparatus is held by a holding device on the side of the apparatus, from which it can be released by actuation of an actuation member provided on the side of the apparatus. Thus, the drawer cannot be withdrawn from the apparatus until beforehand the relevant actuation member has been intentionally actuated. As a result, it is ensured that the drawer cannot be withdrawn from the apparatus by an unintentional manipulation.

In this connection, it is further advantageous when the actuation member comprises an electrical ON/OFF switch of the apparatus, while the drawer is released from the holding device by a further actuation of the ON/OFF switch by electrically switching off the apparatus. Thus, it is ensured that the drawer can in fact be only withdrawn from the scanning apparatus after this apparatus has electrically been switched off, as a result of which, as is known, a conspicuous damage of the electronic elements contained in the chip card is avoided.

In order that the invention may be readily carried out, it will now be described more fully with reference to the accompanying drawings, in which an embodiment of the invention is shown, to which it is not limited, however.

IN THE DRAWING

DESCRIPTION OF THE PREFERRED EMBODIMENT

Figure 1:
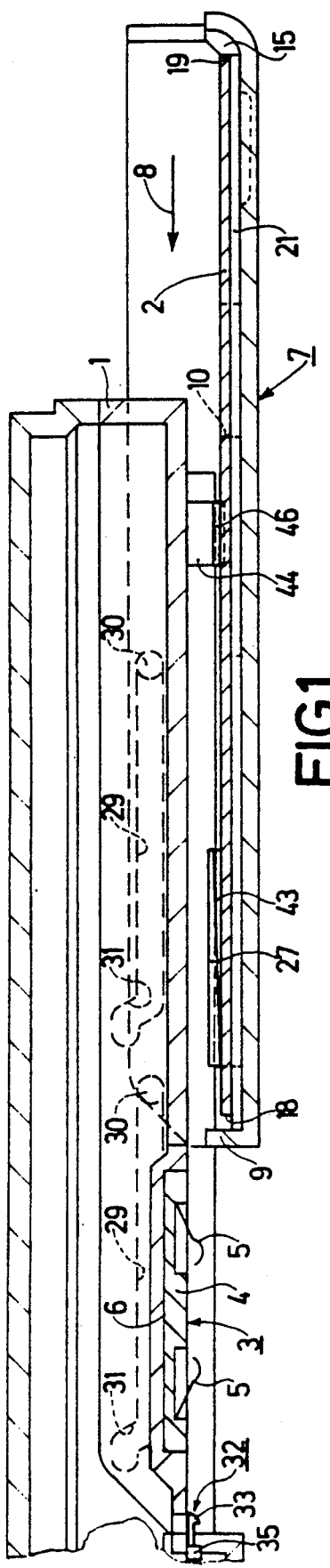
FIG. 1 shows sectionwise a scanning apparatus in longitudinal sectional view with a drawer withdrawn therefrom, into which a chip card is inserted.

In the Figures, reference numeral 1 designates the housing of a scanning apparatus for a chip card 2. In such chip cards, electronic elements, such as, for example, memories (not shown) for storing data in digital form, are accommodated in a usual manner. In order to be able to put such a chip card into use, for example, contacts 2' are provided at one major surface thereof, which contacts are in connection with the electrical circuitry within the chip card. When inserting a chip card into the scanning apparatus, a set of contacts 5 accommodated in the apparatus is connected to the 2' on the chip card, as a result of which electrical connections are established between the scanning apparatus and the chip card and the chip card can thus be put into use.

In the present case, the apparatus contact assembly 3 comprises a set of contacts 5 and a carrier 4 to which contacts 5 are secured, of which two contacts are shown here. Assembly 3 is fixedly arranged with its carrier 4 to the scanning apparatus, for which purpose carrier 4 is inserted, for example, into a recess 6 of the housing 1 of the apparatus. The assembly 3 fixedly arranged on the side of the apparatus offers the advantage that no flexible lead connections to its contacts 5 are required, which during the operation of the apparatus are subjected to bending loads, as would be the case with a set of contacts displaceably arranged in the apparatus.

Figure 4:
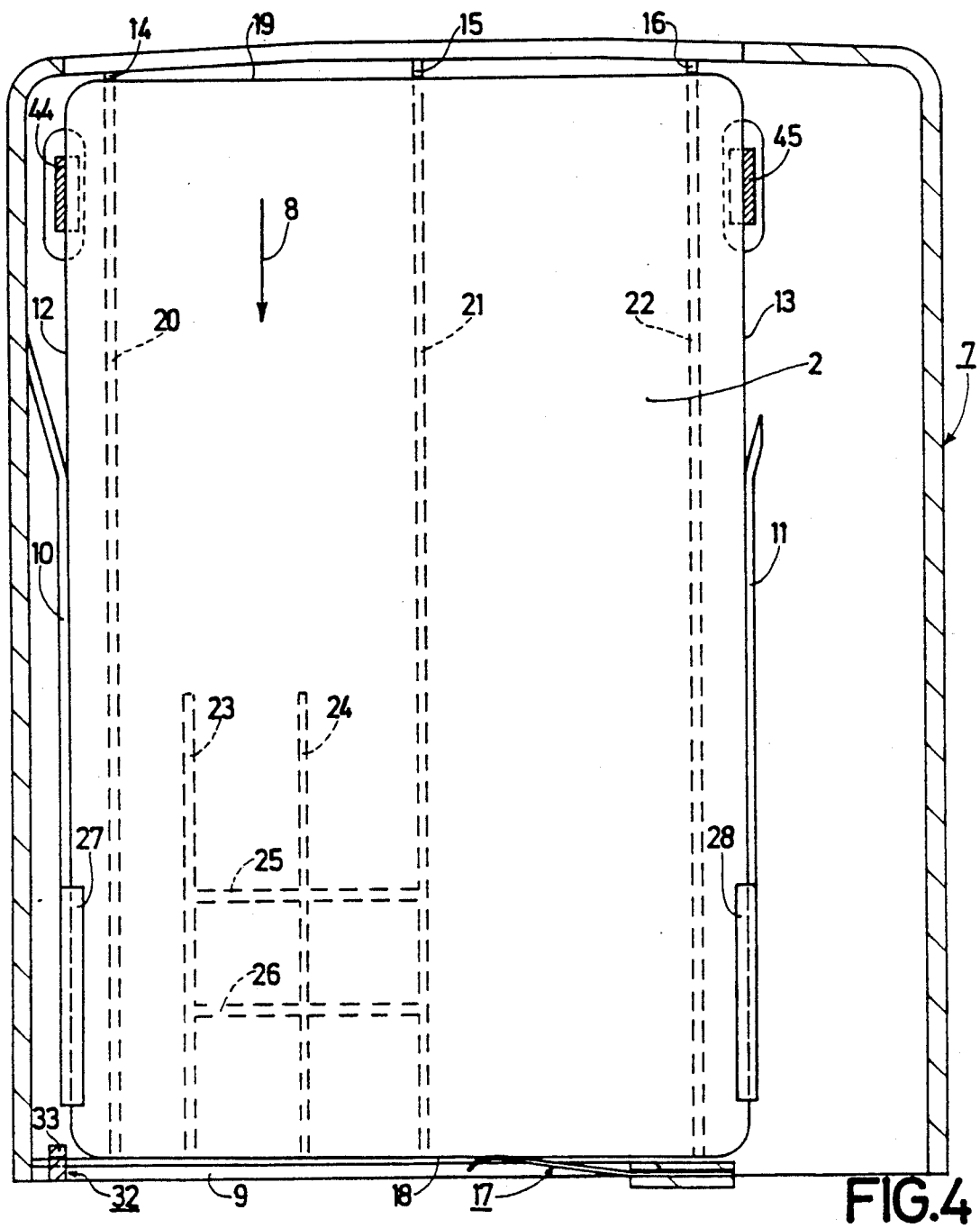
FIG. 4 is a sectional view taken on the line IV—IV in FIG. 2 of the drawer.

For inserting a chip card 2 into the scanning apparatus, the contacts 2' on the chip card are engaged by the set of contacts 5 of assemblies 3 on the side of the apparatus. In this case, a drawer 7, which can be withdrawn from the scanning apparatus and into which a chip card 2 can be inserted by hand, is shown in FIG. 1. The chip card 2 is inserted into an accommodation space of the drawer 7 limited by abutment stops, formed by guide ribs 10 and 11, as is apparent more particularly from FIG. 4. In the present case, ribs 10 and 11 laterally limit the accommodation space transverse the direction arrow 8 of insertion of the drawer 7 and of the chip card 2, respectively, into the apparatus. Ribs 10 and 11 originate from the region of the drawer facing the contact assembly 3 and hence from the end 9 of the drawer 7, extend along a section of the accommodation space. The ribs 10 and 11 guide the chip card upon insertion into the accommodation space along the card lateral edge regions 12 and 13. Three abutment stops 14, 15 and 16 in the form of protrusions limit the accommodation space in the direction 8 opposite to the direction of insertion. Viewed in the direction 8 of insertion, the accommodation space is limited by the end 9 of the drawer 7. End 9 of the drawer limits the accommodation space with a blade spring device 17. Device 17 cooperates with the relevant edge region 18 of the chip card 2 inserted into the accommodation space within the drawer and holds the card 2 in engagement with the abutment stops 14, 15 and 16 at the opposite edge region 19 of card 2. In order that the chip card 2 does not engage the bottom of the drawer 7 over a large surface area, which could give rise to undefined engagement ratios, rib-shaped parts 20 to 26 are provided at the area of the accommodation space within the drawer 7 at the bottom thereof. The chip card 2 engages these parts in a faultless manner by one of the major surfaces of the chip card. A region of one major surface of the chip card which is opposite the region of the other major surface carrying the card contacts 2' is reliably supported. Finally, the guide ribs 10 and 11 are provided in the region of the drawer facing the set of contact assembly 3 sectionwise with rims 27 and 28 overlapping the accommodation space, as a result of which rims the accommodation space is fully defined providing a reference location for a chip card 2 within the drawer 7, into which space a chip card can then be inserted or introduced by hand in a simple manner.

As is apparent from FIG. 1, a chip card 2 inserted into the accommodation space within the drawer 7 withdrawn from the scanning apparatus is situated with respect to the scanning apparatus at a level which is located at a certain distance from the level of the set of contacts 5 of assembly 3. For guiding the drawer when it is inserted into the scanning device, guide means are provided, which cooperate on both sides with the drawer 7 and may comprise pins 30 and, for example, slots 29. Slots 29, comprising two pairs arranged consecutively in direction 8, are provided on both sides in the housing 1 of the apparatus and into which slots engage pins 30 laterally provided at the drawer 7. The slots 29 and pins 30 are shaped so that the drawer 7 upon insertion into the apparatus is displaced in the region of the set of contacts 5 of assembly 3 stepwise towards the level of contacts 5. The stepwise change in levels is effected by the level steps 31 of the slots 29. Due to this displacement in level of the drawer 7 upon insertion into the scanning apparatus, the chip card 2 inserted into its accommodation space is carried with its contacts 2' to the set of contacts 5 fixedly arranged on the side of the apparatus, a slipping contacting of the contacts 2' on the chip card 2 being effected in the last section of this movement cycle with the set of contacts 5, as a result of which slipping contact, as is known, a faultless and reliable contacting is provided. Within the scope of the prior art, of course, there are also other possibilities for the construction of the guide means cooperating with the drawer in the manner described.

Figure 2:
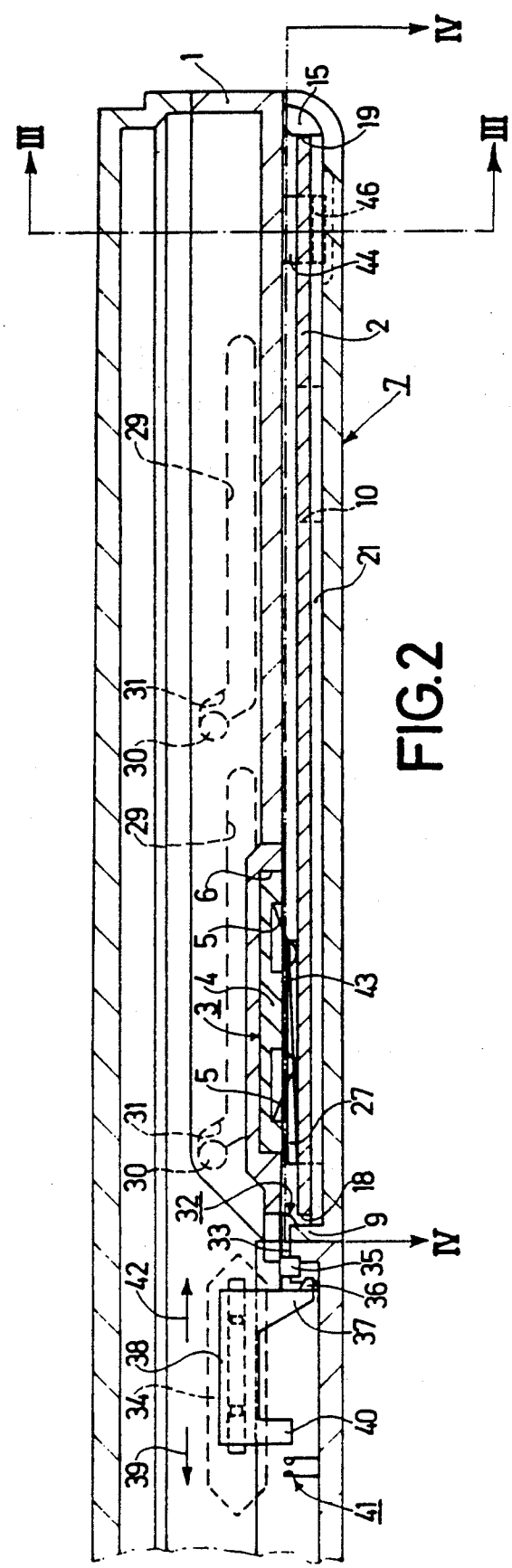
FIG. 2 shows the apparatus of FIG. 1 with a drawer inserted into it.

In the position of the drawer 7, in which it is inserted into the scanning apparatus, as shown in FIG. 2, the drawer 7 is held by a holding device 32 on the side of the apparatus, which comprises a resilient hook 33, which falls into the area of the end 9 of the drawer 7, as a result of which the drawer is reliably held in the operation position for the chip card and cannot be withdrawn unintentionally from the scanning apparatus. The drawer 7 can be released from this holding device 32 only by the actuation of an actuation member 34, which is on the side of the apparatus and in this case is in the form of a slide so that an intentional operation must be carried out to permit of withdrawing the drawer 7 from the apparatus. In the present case, for this purpose the hook 33 is provided with a projection 35, with which an obliquely extending projection 36 cooperates upon displacement of the actuation member 34. Projection 36 is secured to arm 37 of a guide part 38 of the actuation member 34 hook 33 is lifted by projection 36 and thus the drawer 7 is released to be withdrawn from the scanning apparatus. In the present embodiment, the actuation member 34 is part of the electrical ON/OFF switch mechanism of the scanning apparatus, the drawer 7 being released from the holding device 32 by a further actuation of the ON/OFF switch after the apparatus has been electrically switched off. In the position of the actuation member 34 shown in FIG. 2, the scanning apparatus is switched off electrically. When the actuation member 34 is displaced from this switched-off position in the direction of the arrow 39, a pair of contacts 41 is closed through an arm 40 of the guide part 38, which pair of contacts switches on the apparatus electrically. When the actuation member 34 is displaced from the switched-off position in the direction of the arrow 42, the drawer 7 is released from the holding device 32 through the obliquely extending projection 36 due to its cooperation with the projection 35 of the hook 33. Thus, the drawer 7 cannot be withdrawn from the scanning apparatus until the scanning apparatus has been electrically switched off, as a result of which it is ensured that the electronic elements contained in the chip card cannot be damaged by electrical processes. Of course, the holding device 32 may also take a form different from that of a hook in order to attain the mode of operation described above. For example, the holding device may also be comprise a magnet, which holds the drawer magnetically through a magnetic armature, in which event the drawer can be lifted by means of a ram provided at an actuation member on the side of the apparatus or the magnet can be lifted from the drawer and the drawer can thus be released from the holding device.

Figure 5:
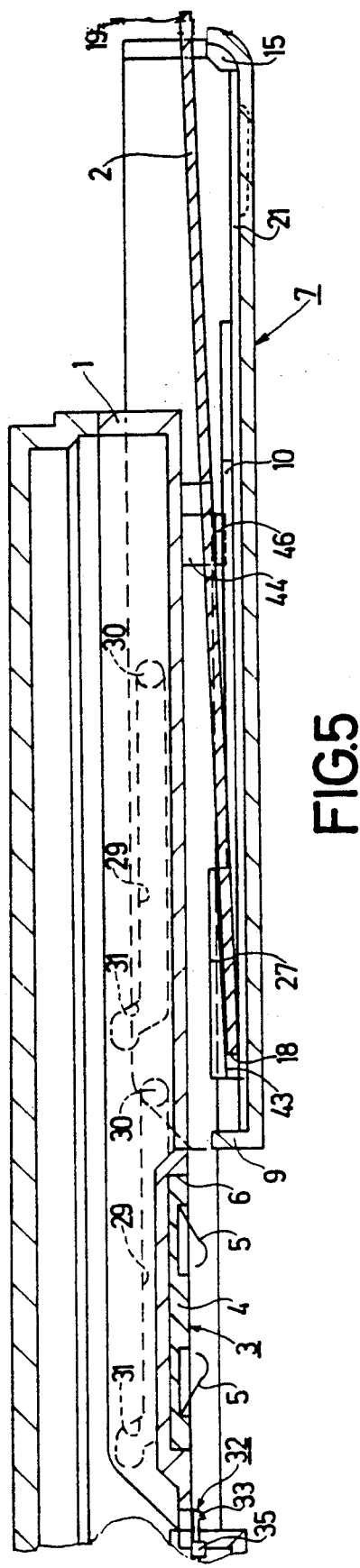
FIG. 5 shows in the same manner as FIG. 1 the scanning apparatus shown in FIG. 2, while the drawer is again withdrawn from the scanning apparatus and the chip card is ready to be removed from the drawer.

In the present embodiment, rims 27 and 28 overlapping the accommodation space are provided with boundary surfaces, which face the accommodation space and, viewed in the direction opposite to the direction of insertion 8, extend away from the accommodation space obliquely upwards. In FIGS. 1, 2 and 5, the relevant obliquely extending boundary surface 43 of rim 27 is shown. As a result, it is possible to insert a chip card into the accommodation space within the drawer 7 and to remove it from the accommodation space so as to also lightly extend the card obliquely. Of course, it would also be possible to arrange the rims 27 and 28 as such, viewed in the direction opposite to the direction of insertion 8, at the guide ribs 10 and 11 so as to ascend obliquely away from the accommodation space.

Figure 3:
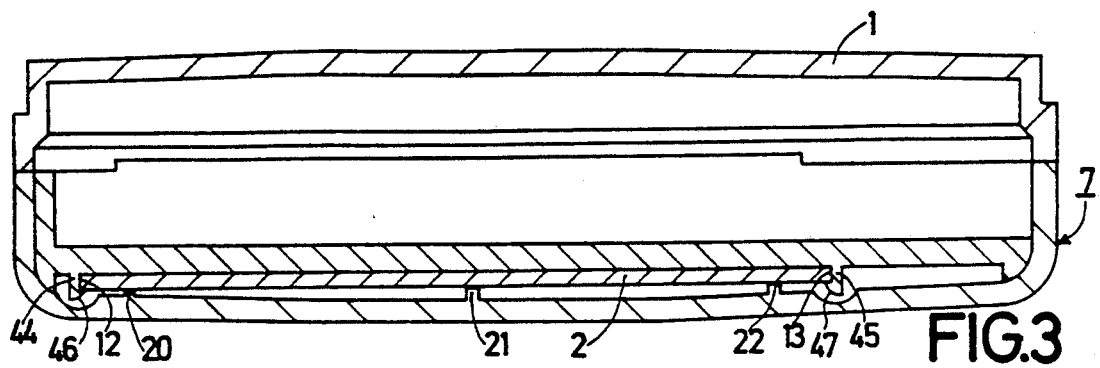
FIG. 3 is a sectional view taken on the line III—III in FIG. 2.

Further, in the present embodiment, the apparatus housing 1, FIG. 3, includes, viewed in the direction of insertion 8, laterally spaced facing hooks 44 and 45 extending beside the accommodation space. The hooks project essentially in a region remote from the drawer 7 into the latter, are resilient transversely to the direction of insertion 8 and have, as is apparent from FIG. 3, at their free end ascending surfaces 46 and 47, respectively, adapted to cooperate with the relevant lateral edge regions 12 and 13, respectively, of a chip card. The height of the hooks 44 and 45 is chosen, so that when the drawer 7 is withdrawn from the scanning apparatus, the apparatus free ends are located above the relevant edge regions of a chip card inserted into the accommodation space within the drawer, as is apparent from FIG. 1. During the operation of inserting the drawer into the apparatus, the drawer being displaced stepwise to the level of the set of contacts 5, a chip card located in the accommodation space within the drawer falls with its edge regions 12 and 13, respectively, into the hooks 44 and 45. In this process, the lateral edge regions 12 and 13 of the chip card engage and cooperate with the ascending surfaces 46 and 47 provided at the free ends of the hooks 44 and 45. The hooks 44 and 45 resiliently deflected transversely to the direction of insertion 8 until the hooks engage under the chip card in its edge regions 12 and 13 in its operating position when the drawer is inserted into the scanning apparatus, as is apparent from FIGS. 2 and 3. During the operation of withdrawing the drawer 7 from the scanning apparatus, when it is displaced stepwise away from the level of the set of contacts 5, the chip card 2 is held in its region remote from the set of contacts 5 by the hooks 44 and 45 on the side of the apparatus at the level of the set of contacts 5. As the drawer is withdrawn, the hooks 44 and 45, being secured to housing 1, lift the card 2 from the accommodation space during the relative lowering of drawer 7. Such a partial lifting of the chip card from the accommodation space within the drawer ensures that the chip card, which under the action of the spring device 17 bears with its edge portion 19 on the projections 14, 15 and 16, is released with its edge region 19 from these projections 14, 15 and 16. After such release, under the action of the spring device 17 in the direction opposite to the direction of insertion 8, the card 2 is partly pushed out of the drawer 7, as shown in FIG. 5. A chip card thus pushed out of the drawer can then be gripped by hand and be completely removed from the drawer in a very simple manner. The boundary surfaces of the drawer, which are provided at the rims 27 and 28, face the accommodation space and are arranged, viewed in the direction 8 opposite to the direction of insertion, so that they extend obliquely upwards away from the accommodation space. This permit pushing obliquely the chip card out of the drawer without a bending the chip card. However, in the case no spring device for pushing the chip card 2 out of the drawer 7 is provided, the hooks 44 and 45, which hold the chip card during the operation of withdrawing the drawer from the apparatus at the level of the set of contacts, ensure that the chip card is partly lifted from the accommodation space within the drawer, as a result of which in itself the chip card can also be more readily gripped by hand and can be completely removed from the drawer because it no longer bears completely on the bottom of the drawer.

As appears from the above description, a chip card can be introduced into the scanning apparatus and can also be removed therefrom again in a simple and reliable manner. Further, a faultless and reliable engaging of the contacts on the chip card by the set of contacts fixedly arranged on the side of the apparatus is guaranteed, without displaceable contacts in the apparatus. The manipulation of a scanning apparatus thus cosntructed is then also simple and reliable. It further appears from the above description that a series of variations of the embodiment described is possible without departing from the scope of the invention.

I claim:

1. A scanning apparatus for a chip card, said apparatus having a first set of fixedly arranged contacts for engaging a second set of contacts on the card, said apparatus including a displaceable chip card accommodation device, said apparatus comprising:
    a drawer having a card accommodation space for releasably receiving said card at a reference location therein;
    housing means including said first set of contacts fixedly secured thereto at a given level and drawer guide means for releasably securing said drawer thereto at different step levels relative to the given level at the region of said first set of contacts as said drawer is displaced in an insertion direction transverse said different step levels so as to cause said received card to stepwise displace toward said first set of contacts during displacement of said drawer in said insertion direction; and
    guide ribs secured to the drawer and forming two spaced abutment stops for laterally limiting the accommodation space in the direction of insertion of the chip card into the accommodation space within the drawer, said guide ribs originating from the region of the drawer facing the first set of contacts and extending along at least one section of the accommodation space, said guide ribs in the region of the drawer facing the first set of contacts including rims overlapping the accommodation space, at least the boundary surfaces of the rims facing the accommodation space viewed in the direction opposite to the direction of insertion, extending obliquely upwards away from the accommodation space.

2. A scanning apparatus as claimed in claim 1 wherein viewed in the direction of insertion, the apparatus includes a pair of hooks secured to the housing means and extending laterally beside and on each side of the accommodation space, said hooks each essentially projecting in a region of the drawer remote from the first set of contacts into the drawer, said hooks being resilient transversely to the direction of insertion and each having an ascending surface at its extended end adapted to cooperate with a mating lateral edge region of a chip card, such that during insertion of the drawer into the apparatus, when it is displaced stepwise to the level of the first set of contacts, a chip card inserted into the accommodation space within the drawer engages the hooks and during withdrawing of the drawer from the apparatus, when it is displaced stepwise away from the level of the first set of contacts, the chip card is held by the hooks at the level of the first set of contacts and is then lifted at least in part from the accommodation space within the drawer.

3. A scanning apparatus as claimed in claim 2 including a holding device coupled to the housing for holding the drawer with the second contacts engaged with the first contacts and an actuation member on the side of the apparatus coupled to the holding device for releasing the drawer by the actuation of said actuation member.

4. A scanning apparatus as claimed in claim 2 including a spring device coupled to the drawer, said device cooperating with a chip card inserted in the accommodation space within the drawer for loading the chip card in the direction opposite to the direction of insertion and for holding the card engaged with at least one of said abutment stops, which at least one stop limits the accommodation space within the drawer in the direction opposite to the direction of insertion and from which at least one stop the chip card is released during the operation of withdrawing the drawer from the apparatus by the hooks holding the card at the level of the first set of contacts and is pushed partly out of the drawer under the action of the spring device in the direction opposite to the direction of insertion.

5. A scanning apparatus as claimed in claim 4 including a holding device coupled to the housing for holding the drawer with the second contacts engaged with the first contacts and an actuation member on the side of the apparatus coupled to the holding device for releasing the drawer by the actuation of said actuation member.

6. A scanning apparatus as claimed in claim 5 wherein the actuation member comprises an electrical ON/OFF switch of the apparatus, said actuation member including means such that the drawer is released from the holding device by a further actuation of the member after the apparatus has been electrically switched off by an initial actuation of said member.

7. A scanning apparatus as claimed in claim 1 including a holding device coupled to the housing for holding the drawer with the second contacts engaged with the first contacts and an actuation member on the side of the apparatus coupled to the holding device for releasing the drawer by the actuation of said actuation member.

8. A scanning apparatus as claimed in claim 7 wherein the actuation member comprises an electrical ON/OFF switch of the apparatus, said actuation member including means such that the drawer is released from the holding device by a further actuation of the member after the apparatus has been electrically switched off by an initial actuation of said member.

9. An apparatus for electrically connecting a first set of contacts on the apparatus to a second set of contacts on a chip card, said apparatus including a displaceable chip card accommodation device, said apparatus comprising:

a drawer having a card accommodation space for releasably receiving said card at a reference location therein;

housing means including said first set of contacts fixedly secured thereto at a given level;

drawer guide means coupled to the housing means for releasably receiving the drawer in an insertion direction, said drawer and guide means including means constructed so that the drawer displaces toward said first set of contacts in a direction transverse said insertion direction as said drawer is inserted in said insertion direction, said reference location being such that said second set of contacts engages said first set of contacts during said insertion; and hook means secured to the housing means adapted to engage the chip card during said insertion and for lifting the chip card from said drawer as said drawer is withdrawn in a direction opposite said insertion direction.

10. A scanning apparatus as claimed in claim 9 including a holding device coupled to the housing for holding the drawer with the second contacts engaged with the first contacts and an actuation member on the side of the apparatus coupled to the holding device for releasing the drawer by the actuation of said actuation member.

11. A scanning apparatus as claimed in claim 10 wherein the actuation member comprises an electrical ON/OFF switch of the apparatus, said actuation member including means such that the drawer is released from the holding device by a further actuation of the member after the apparatus has been electrically switched off by an initial actuation of said member.

12. The apparatus of claim 9 wherein said drawer includes tapered rim means for defining the accommodation space and for permitting the card to be lifted from said space when said drawer is withdrawn.

13. A scanning apparatus for a chip card, said apparatus having a first set of fixedly arranged contacts for engaging a second set of contacts on the card, said apparatus including a displaceable chip card accommodation device, said apparatus comprising:

a drawer having a card accommodation space for releasably receiving said card at a reference location therein;

housing means including said first set of contacts fixedly secured thereto at a given level and drawer guide means for releasably securing said drawer thereto at different step levels relative to the given level at the region of said first set of contacts as said drawer is displaced in an insertion direction transverse said different step levels so as to cause said received card to stepwise displace toward said first set of contacts during displacement of said drawer in said insertion direction; and hook means secured to the housing means adapted to engage the chip card during said insertion and for lifting the chip card from said drawer as said drawer is withdrawn in a direction opposite said insertion direction.

14. A scanning apparatus as claimed in claim 13 wherein viewed in the direction of insertion, said hook means comprises a pair of hooks secured to the housing means and extending laterally beside and on each side of the accommodation space, said hooks each essentially projecting in a region of the drawer remote from the first set of contacts into the drawer, said hooks being resilient transversely to the direction of insertion and each having an ascending surface at its extended end adapted to cooperate with a mating lateral edge region of a chip card, such that during insertion of the drawer into the apparatus, when it is displaced stepwise to the level of the first set of contacts, a chip card inserted into the accommodation space within the drawer engages the hooks and during withdrawing of the drawer from the apparatus, when it is displaced stepwise away from the level of the first set of contacts, the chip card is held by the hooks at the level of the first set of contacts and is then lifted at least in part from the accommodation space within the drawer.

15. A scanning apparatus as claimed in claim 14 including a plurality of guide ribs secured to the drawer and forming two spaced abutment stops for laterally limiting the accommodation space in the insertion direction and a spring device coupled to the drawer, said device cooperating with a chip card inserted in the accommodation space within the drawer for loading the chip card in the direction opposite to the direction of insertion and for holding the card engaged with at least one of said abutment stops, said at least one stop limiting the accommodation space within the drawer in the direction opposite to the direction of insertion and from which at least one stop the chip card is released during the operation of withdrawing the drawer from the apparatus by the hooks holding the card at the level of the first set of contacts and is pushed partly out of the drawer under the action of the spring device in the direction opposite to the direction of insertion.

16. A scanning apparatus as claimed in claim 15 including a holding device coupled to the housing for holding the drawer with the second contacts engaged with the first contacts and an actuation member on the side of the apparatus coupled to the holding device for releasing the drawer by the actuation of said actuation member.

17. A scanning apparatus as claimed in claim 16 wherein the actuation member comprises an electrical ON/OFF switch of the apparatus, said actuation member including means such that the drawer is released from the holding device by a further actuation of the member after the apparatus has been electrically switched off by an initial actuation of said member.

18. A scanning apparatus for a chip card, said apparatus having a first set of fixedly arranged contacts for engaging a second set of contacts on the card, said apparatus including a displaceable chip card accommodation device, said apparatus comprising:

a drawer having a card accommodation space for releasably receiving said card at a reference location therein;

housing means including said first set of contacts fixedly secured thereto at a given level and drawer guide means for releasably securing said drawer thereto at different step levels relative to the given level at the region of said first set of contacts as said drawer is displaced in an insertion direction transverse said different step levels so as to cause said received card to stepwise displace toward said first set of contacts during displacement of said drawer in said insertion direction;

a holding device coupled to the housing for retaining the drawer with the second contacts engaged with the first contacts; and an actuation member secured to the side of the apparatus and coupled to the holding device for release of the holding device in response to actuation of the actuation member.

19. A scanning apparatus as claimed in claim 18, wherein viewed in the direction of insertion, the apparatus includes a pair of hooks secured to the housing means and extending laterally beside and on each side of the accommodation space, said hooks each essentially projecting in a region of the drawer remote from the first set of contacts into the drawer, said hooks being resilient transversely to the direction of insertion and each having an ascending surface at its extended end adapted to cooperate with a mating lateral edge region of a chip card, such that during insertion of the drawer into the apparatus, when it is displaced stepwise to the level of the first set of contacts, a chip card inserted into the accommodation space within the drawer engages the hooks and during withdrawing of the drawer from the apparatus, when it is displaced stepwise away from the level of the first set of contacts, the chip card is held by the hooks at the level of the first set of contacts and is then lifted at least in part from the accommodation space within the drawer.

20. A scanning apparatus as claimed in claim 19 including a plurality of guide ribs secured to the drawer and forming two spaced abutment stops for laterally limiting the accommodation space in the insertion direction and a spring device coupled to the drawer, said device cooperating with a chip card inserted in the accommodation space within the drawer for loading the chip card in the direction opposite to the direction of insertion and for holding the card engaged with at least one of said abutment stops, said at least one stop limiting the accommodation space within the drawer in the direction opposite to the direction of insertion and from which at least one stop the chip card is released during the operation of withdrawing the drawer from the apparatus by the hooks holding the card at the level of the first set of contacts and is pushed partly out of the drawer under the action of the spring device in the direction opposite to the direction of insertion.

21. A scanning apparatus as claimed in claim 18 wherein the actuation member comprises an electrical ON/OFF switch of the apparatus, said actuation member including means such that the drawer is released from the holding device by a further actuation of the member after the apparatus has been electrically switched off by an initial actuation of said member.

* * * * *